United States Patent
Hagelthorn et al.

(10) Patent No.: US 6,233,837 B1
(45) Date of Patent: May 22, 2001

(54) AXLE ALIGNMENT USING A REFLECTED SIGNAL

(75) Inventors: George Allan Hagelthorn, Dearborn; Nancy L. Saxon, Rochester; Janelle M. Gilbert, Shelby Township, all of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/322,868

(22) Filed: May 28, 1999

(51) Int. Cl.[7] ................................................... G01B 11/27
(52) U.S. Cl. ........................ 33/288; 33/608; 33/DIG. 21
(58) Field of Search ............................. 33/288, 227, 286, 33/203, 203.15, 203.18, 608, DIG. 1, DIG. 21

(56) References Cited

U.S. PATENT DOCUMENTS

| | | | |
|---|---|---|---|
| 2,292,969 | * 8/1942 | Peters | 33/DIG. 1 |
| 2,496,324 | * 2/1950 | Wilson | 33/203.15 |
| 2,656,762 | * 10/1953 | Carr | 33/203.15 |
| 3,288,020 | * 11/1966 | Lill | 33/288 |
| 3,501,240 | * 3/1970 | Haynes | 33/288 |
| 4,337,581 | 7/1982 | Eck | 33/288 |
| 4,347,668 | 9/1982 | Johnston. | |
| 4,827,623 | * 5/1989 | Goodell | 33/288 |
| 5,018,853 | 5/1991 | Hechel et al. | 33/288 |
| 5,131,161 | * 7/1992 | Drag | 33/DIG. 1 |
| 5,274,433 | * 12/1993 | Madey et al. | 33/288 |
| 5,561,244 | 10/1996 | Olesky et al. | 33/203.18 |
| 5,600,893 | * 2/1997 | Phillips | 33/288 |

* cited by examiner

Primary Examiner—Christopher W. Fulton
(74) Attorney, Agent, or Firm—Carlson, Gaskey & Olds, P.C.

(57) ABSTRACT

An axle alignment system includes a transmitter, reflectors, and an indicator area. The transmitter transmits signals, preferably laser beams, to each reflector. Signals received by the reflectors attached to the end of the axles are reflected at a predetermined angle and direction to be viewed on an indicator area. The indicator area receives the redirected signals from each reflector and provides a visual illustration of the relationship between the suspension axle and another suspension part such as the suspension subframe siderails. Accordingly, the angularity of the axles relative to the siderails may be adjusted such that each of the reflected signals are displayed simultaneously on a reference marker. Once the reflected signals are aligned with respect to the reference marker, the axles are assured to be in accurate alignment.

15 Claims, 2 Drawing Sheets

AXLE ALIGNMENT USING A REFLECTED SIGNAL

BACKGROUND OF THE INVENTION

The present invention relates to an axle alignment system, and more particularly to an alignment system which uses a reflected signal to align an axle of a trailer.

Trailer axle assemblies are typically combinations of suspensions and axles manufactured at various locations other than the trailer manufacturing plant. The suspension assembly includes linkages and components on which to mount a pair of axles. The trailer manufacturer attempts to align the axles relative to the suspension elements, and to align the axles parallel to one another. Proper alignment of a trailer's axles is important for proper handling and vehicle safety. In addition, proper alignment decreases fuel consumption and improves ride quality and tire wear. These qualities are particularly important for heavy freight carrying vehicles which must travel long distances. However, obtaining the proper alignment in an assembly line setting is difficult, as the minute adjustments must be made quickly and accurately. Of course, these complexities are multiplied when aligning a multi-axle suspension assembly.

Typically, the prior art at the trailer assembly plant has been to measure the distances from the ends of the front axle with respect to a common reference point such as a kingpin. The relative position of a second axle is then manually measured. After the initial adjustment has been made to start the adjustment process, it is often necessary to measure more than once to achieve the correct adjustment. This procedure is very time consuming.

After the trailer has been placed into commercial service, the prior art has sometimes used laser alignment systems for maintenance operations. The laser equipment is attached to the axle wheel assembly to cause the laser beam to impact an established reference point, such as a kingpin, if the axle is in proper alignment.

Lasers have also been used to align wheels in automotive applications. However, lasers have not been used to align axles on independent subframes by any component manufacturing assembly line.

Accordingly, it is desirable to provide an accurate alignment system that is relatively inexpensive, operates quickly and can align a plurality of axles simultaneously.

SUMMARY OF THE INVENTION

The axle alignment system of the present invention generally includes a transmitter, a reflector and an indicator area. Preferably, the transmitter is located in association with an assembly line such that the axles are aligned while a continued flow of suspension assemblies along the line is maintained.

The reflectors are positioned on the precision surfaces of the bearing journal. Preferably, the reflector is magnetically attachable to a bearing journal of the axle. The reflectors, which are assembled to V-blocks having controllable magnetic strength, can be accurately placed and secured on the bearing journals. This is done with manual adjustment of the magnetic strength of the V-blocks on which each reflector is attached. Similarly, the reflector is quickly and easily removed once the alignment is complete.

In this instance, the transmitter transmits the signal, a laser beam, through an arrangement of beam splitters that divide and redirect the separated laser beams to each of the reflectors located on the axle spindles. The visual laser beams which are caused to impact the reflectors are reflected back in a controlled manner to visually impact on an indicator area attached to the transmitter.

The indicator area shows the reflected signal from each reflection to visually illustrate the angular relationship between the axles as well as the suspension subframe siderails. To aid in the alignment process, the indicator area preferably includes a reference marker that indicates the correct position for the reflected beams if the axles are properly aligned relative to the siderails. The axles are easily adjusted relative to the siderail using each of the reflected laser beams displayed on the indicator area for visual reference. Once the reflected signals are properly aligned on the reference area, the axles are assured to be parallel to one another and perpendicular to the siderail.

The present invention greatly reduces the time and complexity of aligning the axles relative to the suspension siderails or the assembly line.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
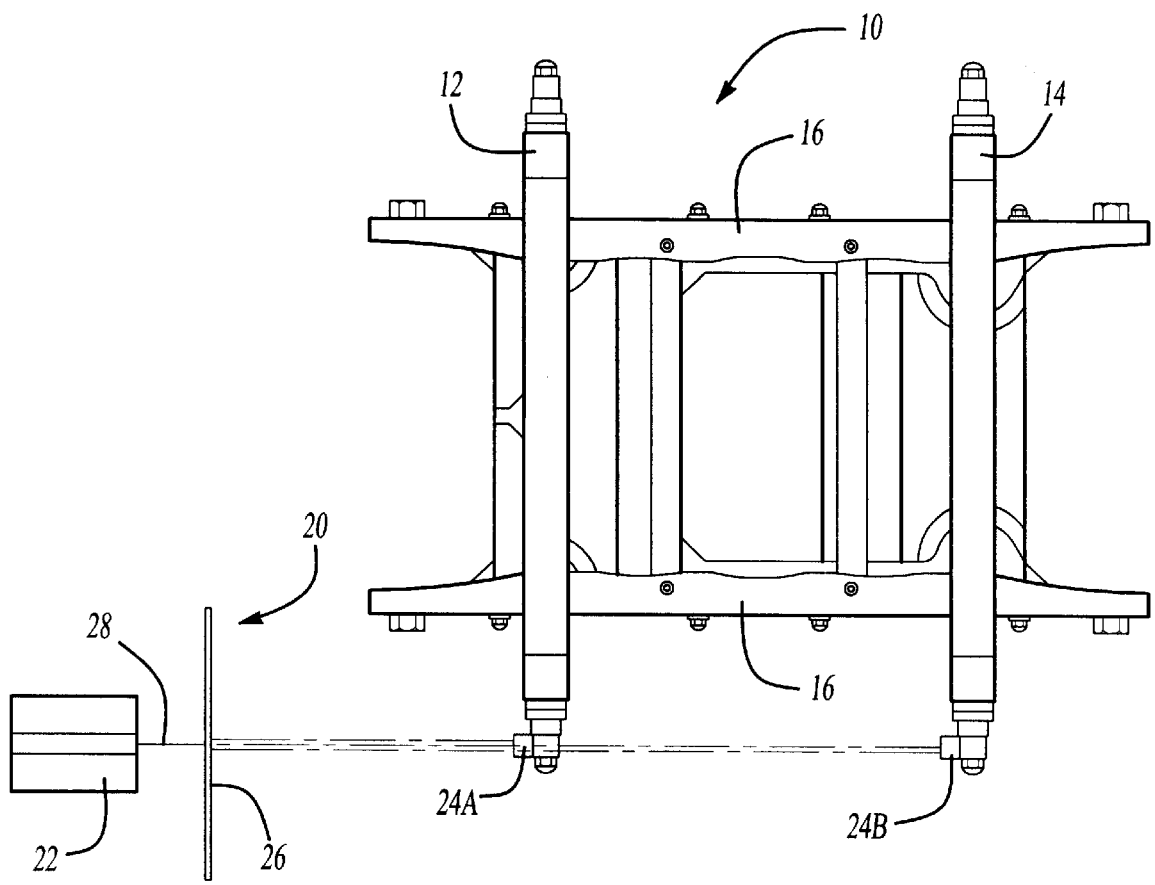
FIG. 1 is a top plan view of an axle alignment system according to the present invention.

FIG. 1 illustrates a top plan view of a common multi-axle vehicle suspension assembly 10. The suspension assembly 10 includes a first axle 12 and a second axle 14 mounted substantially transverse to a pair of suspension siderails 16. Although a particular multi-axle assembly is shown in the illustrated embodiment, one skilled in the art will understand that the present invention is similarly applicable to many other suspension assemblies.

The axle alignment system 20 of the present invention generally includes a transmitter 22, a reflector 24 and an indicator area 26. As will be further described below, the transmitter 22 transmits a signal (shown schematically at 28) such as a laser beam to reflectors 24A and 24B which reflect the signal to an indicator area 26.

Figure 2:
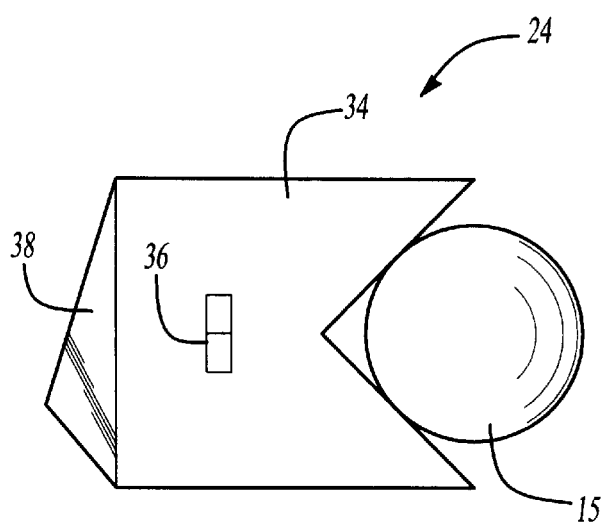
FIG. 2 is an exploded view of a reflector according to the present invention mounted to an axle.
Figure 4:
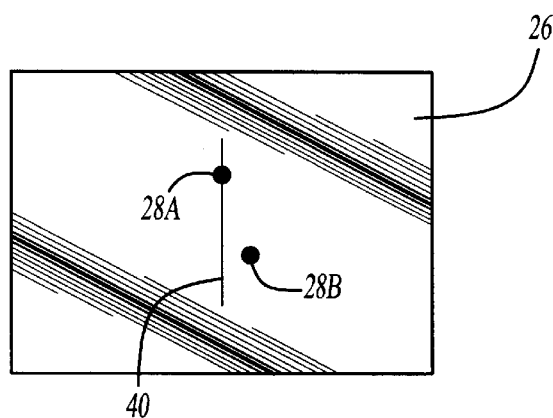
FIG. 4 is an exploded view of the indicator area as viewed by an operator showing the reflected signal in relationship to a reference marker.

The reflectors 24 are preferably magnetically attachable to the axles 12,14. As shown in FIG. 2, a V-block 34 of the reflector 24 mounts to a portion, preferably a bearing surface 15, of each axle 12,14. The V-block 34 is magnetically attachable and preferably includes a magnet which is activated by switch 36. The V-shaped opening ensures that the block 34 is properly positioned on the axle 12, 14. The reflector can therefore be accurately positioned and then "locked" in place by activating the magnet. Although the disclosed reflector is positioned by use of a V-block, one skilled in the art will realize that other methods are possible. In addition, each reflector 24 may be specifically manufactured for a specific suspension assembly 10 and include a fixed mirror 38 to reflect the signal 28 to a predetermined direction and angle to strike the indicator area 26. (FIG. 4.) Alternatively, an adjustable mirror can be included to provide a generic reflector for use on multiple suspension assemblies by placing the adjustable mirror in a predefined position dependent on the particular suspension.

Figure 3:
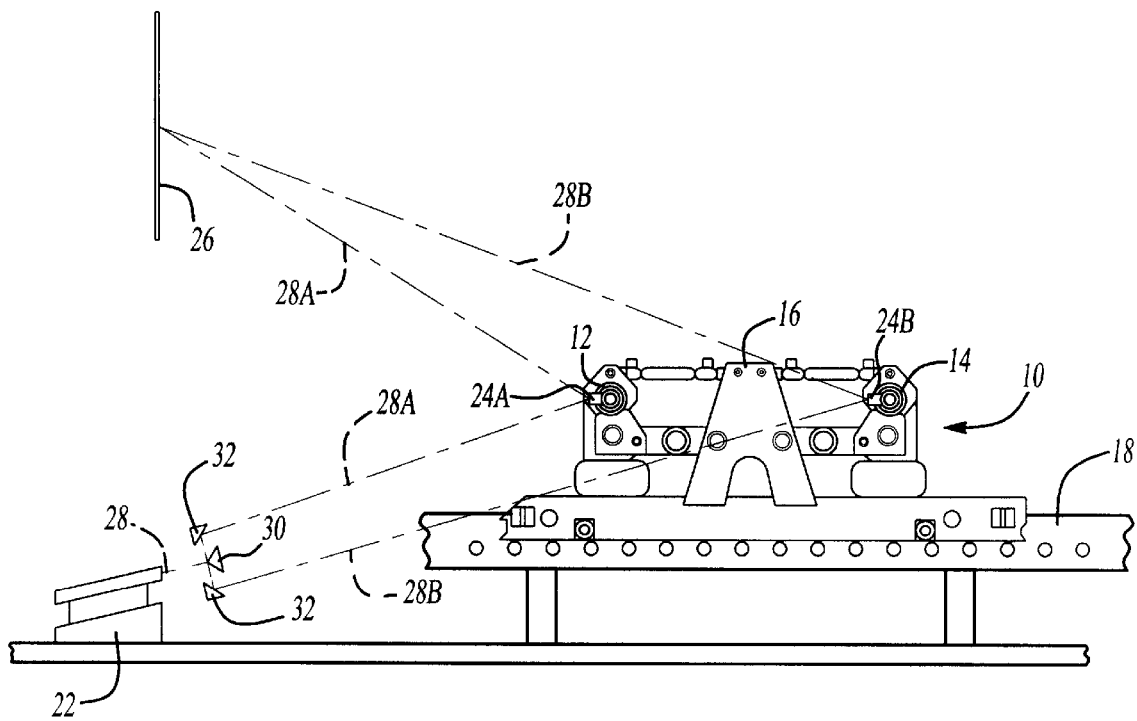
FIG. 3 is a side view of an axle alignment system according to the present invention.

FIG. 3 illustrates a side view of the suspension assembly 10 attached to an assembly line (shown somewhat schematically at 18) at the siderails 16. Preferably, the transmitter 22 is located in association with the assembly line 18 such that a continued flow of suspension assemblies 10 can be maintained. As known the suspension assembly 10 is mounted on the assembly line 18 such that it is properly positioned in a known orientation.

As shown in FIG. 3, the signal 28 is transmitted and an arrangement of beam splitters 30 and directors 32 divide the signal 28 into a plurality of signals 28A, 28B. Each signal 28A, 28B is then directed to a reflector 24A, 24B attached to the first and second axle 12,14 respectively. Again, although two axles are shown, one skilled in the art will realize that the present invention is applicable for a suspension having more than two axles.

In use, the indicator area 26 receives the signal 28A, 28B reflected from each reflector 24A, 24B to provide a visual illustration of the relationship between the axles 12,14 and siderails 16. Although the indicator area 26 is shown as being located independently of the transmitter 22, the indicator area 26 can be similarly mounted directly to the transmitter 22. By mounting the indicator area directly to the transmitter 22, a compact system 20 is provided which is readily incorporated into an assembly line environment. However, for ease of illustrating the reflected beams, the area 26 is shown spaced from transmitter 22.

As shown in FIG. 4, by receiving the signal 28A, 28B, the indicator area 26 provides a clear visual illustration of the relationship between the axles 12, 14 and the siderails 16. The indicator area 26 preferably includes a reference marker 40 which indicates the correct position of the axles 12,14 relative to the sidewall 16. The marker 40 can be set at a proper position relative to the assembly line 18, since the suspension siderails 16 are attached in a known orientation relative to the assembly line 18. Accordingly, the axles 12,14 are adjusted relative to the siderails 16 such that the signals 28A, 28B are displayed on the reference marker 40. Once aligned on the reference marker 40 the axles 12, 14 are assured to be parallel to each other and perpendicular to the siderails 16.

As shown in FIG. 4, for example only, the reflected signal 28A is located on the reference marker 40 which provides a visual indication that the first axle 12 is properly aligned relative to the siderails 16. However, the reflected signal 28B is not located on the reference marker 40 which provides a visual indication that the second axle 14 is not properly aligned. Accordingly, the second axle 14 must be adjusted relative to the siderails 16 until the signal 28B is displayed on the reference marker 40 to obtain the proper alignment of axle 14. The adjustment is made by adjusting structure such as radius rods, 50. The present invention greatly reduces the time and complexity of determining when the axles are properly aligned.

The present invention therefore provides an accurate alignment system that is relatively inexpensive, operates quickly, and can be used to align a plurality of axles simultaneously.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An axle alignment system comprising:
    a reflector attachable to an axle, said axle positioned relative to the subframe siderail;
    a transmitter for transmitting a signal to said reflector, said reflector redirecting said signal to an indicator area to receive said redirected signal such that said indicator area displays a relationship between said axle and said suspension siderail.

2. The system as recited in claim 1, wherein said indicator area is mounted to said transmitter in the form of a reference card.

3. The system as recited in claim 1, wherein said indicator area includes a reference marker.

4. The system as recited in claim 1, wherein said indicator area includes a reference marker, distances between said reflected signal and said reference marker providing visual reference of the degree of alignment of said axle relative to said suspension subframe siderail.

5. The system as recited in claim 4, wherein there are a pair of reflectors, said transmitter transmitting visual laser signals to both of said reflectors such that a pair of axles can be aligned relative to each other.

6. The system as recited in claim 5, wherein each of said reflectors are mountable upon an axle, each axle alignable relative to each other and to the suspension subframe siderail such that a first axle is parallel to a second axle and the first axle and second axle are perpendicular to the suspension subframe siderail.

7. The system as recited in claim 1, wherein said reflector is magnetically attachable to said axle.

8. The system as recited in claim 1, wherein said reflector is attachable to a bearing journal on the spindle end of said axle.

9. A method of axle alignment comprising the steps of:
    (1) transmitting a signal to a reflector attached to the axle mounted with reference to a suspension subframe siderail
    (2) reflecting said signal; and
    (3) adjusting said axle relative to said suspension subframe siderail such that said reflected signal is visually displayed on a reference marker.

10. A method as recited in claim 9, wherein step (1) further comprises simultaneously transmitting visual signals to a plurality of axles mounted to said suspension subframe siderails.

11. A method as recited in claim 9, wherein step (2) further comprises reflecting said signal to an area proximate of said transmitting location.

12. A method as recited in claim 9, wherein step (5) further includes adjusting a first axle parallel to a second axle and the first axle and second axle perpendicular to the suspension subframe siderail.

13. A method of axle alignment comprising the steps of:
    (1) attaching a reflector to an axle mounted with reference to a subframe siderail;
    (2) transmitting a visual signal to said reflectors;
    (3) redirecting said visual signal to provide a reflected signal;
    (4) receiving said reflected signal on an indicator area having a reference marker; and,
    (5) adjusting said axle relative to said suspension subframe siderail such that said reflected signal is displayed on said reference marker.

14. A method as recited in claim 13, wherein step (2) further comprises simultaneously transmitting visual signals to a plurality of axles mounted to said suspension subframe siderail.

15. A method as recited in claim 13, wherein step (5) further includes adjusting a first axle parallel to a second axle and the first axle and second axle perpendicular to the suspension subframe siderail.

* * * * *